United States Patent
Sassaman

(10) Patent No.: US 9,220,363 B2
(45) Date of Patent: Dec. 29, 2015

(54) GRILLING UTENSIL THAT DOUBLES AS A REMOVABLE HANDLE

(71) Applicant: Jeffrey Scott Sassaman, Succasunna, NJ (US)

(72) Inventor: Jeffrey Scott Sassaman, Succasunna, NJ (US)

( * ) Notice: Subject to any disclaimer, the term of this patent is extended or adjusted under 35 U.S.C. 154(b) by 41 days.

(21) Appl. No.: 14/143,331

(22) Filed: Dec. 30, 2013

(65) Prior Publication Data

US 2015/0182067 A1    Jul. 2, 2015

(51) Int. Cl.
*A47G 21/10* (2006.01)
*A47J 36/00* (2006.01)

(52) U.S. Cl.
CPC *A47J 36/00* (2013.01); *A47G 21/10* (2013.01)

(58) Field of Classification Search
USPC ........ 294/3, 9, 7, 10, 15, 16, 17, 24, 26, 27.1, 294/32, 34, 99.2; D8/14
See application file for complete search history.

(56) References Cited

U.S. PATENT DOCUMENTS

| | | | |
|---|---|---|---|
| 2,747,911 A * | 5/1956 | Kuever | 99/450 |
| 3,841,299 A * | 10/1974 | Tomita | 126/25 B |
| D256,655 S * | 9/1980 | Lacey | 294/27.1 |
| 4,244,094 A * | 1/1981 | Rucinski | 29/270 |
| 5,269,286 A * | 12/1993 | Cowan | 126/25 B |
| D427,858 S * | 7/2000 | Zemel | D7/692 |
| 6,536,819 B2 * | 3/2003 | Wang et al. | 294/16 |
| D481,915 S * | 11/2003 | Mezger-Boehringer | D7/686 |
| D658,432 S * | 5/2012 | Zemel | D7/393 |
| D679,963 S * | 4/2013 | Zemel et al. | D7/683 |
| D711,697 S * | 8/2014 | Delgado Carmona et al. | D7/686 |
| 2001/0033083 A1* | 10/2001 | Kaposi | 294/99.2 |
| 2008/0289511 A1* | 11/2008 | Mendez | 99/357 |
| 2009/0134055 A1* | 5/2009 | Spellman | A47J 37/106 206/553 |
| 2009/0284031 A1* | 11/2009 | Pavicsits et al. | 294/16 |

\* cited by examiner

*Primary Examiner* — Paul T Chin
(74) *Attorney, Agent, or Firm* — Joseph Giordano, Esq.

(57) ABSTRACT

A cooking utensil, such as a set of cooking tongs, whereby the fixed distal ends of the tongs are manufactured to contain a notch on each side of the tong end. Also the invention proposes a cooking vessel that has a rectangular orifice into which the distal end of the cooking tong can be inserted. Once inserted, the user would be able to twist the tongs such that each the wall of the cooking vessel would slide within each notch of the tong securing the cooking tongs to the cooking vessel enabling the tongs to be used as a handle for the vessel.

17 Claims, 3 Drawing Sheets

GRILLING UTENSIL THAT DOUBLES AS A REMOVABLE HANDLE

BACKGROUND OF THE INVENTION

1. Field of the Invention

The present invention relates generally to cooking and grilling utensils and more specifically to a grilling tong designed to easily interface with a grilling pan also designed to interconnect with the tongs, the combination of which enables the tongs to also function as a handle for the grilling pan.

2. Description of the Related Art

Cooking vessels and the cooking utensils are essential equipment for the outdoor grilling enthusiast, Tong, forks, spatulas, grilling baskets of many different sizes and shape are known and useful to the outdoor grill cook. Often times the outdoor grill cook uses a grilling basket to grill such items as vegetables or chopped meat. These grilling baskets usually don't have long handles so that the lid of the grill cover can be closed to better cook the food. Because such grill baskets may be heated to high temperatures, they would benefit from having long handles to insulate the hot cooking basket making it safer and easier for the cook to pick up the basket. However, such a long handle though would make it impossible to close the grill cover. So a removable handle for grabbing and manipulating such items would be of benefit. However, a singular purpose device as a removable handle would be just one additional item for the cook to keep track of with all the other utensils grill cooks use while grilling. Accordingly, there is a need in the art for a grilling utensil that can also be used as a removable handle for grilling basket. A review of the available art reveals that there are a number of cooking vessels with removable handles and also a number of grilling utensils.

For example U.S. Pat. No. 6,393,973 issued to Lionel Vela and Michel Montgelard on May 28, 2002 describes a cooking utensil comprising a bowl and a removable grip handle. This patent describes a bowl with a rim projecting outwards from the bowl sidewall with the rim containing an orifice for receiving a handle. The handle is designed to be inserted within the orifice to grip the rim of the bowl and the handle has a lower member to rest on the sidewall below where the handle grips the orifice that braces the handle providing a support for lifting the bowl. However, this removable handle can serve no other purpose.

U.S. Pat. No. 6,318,776 issued to Sang Ok Lee on Nov. 20, 2001 describes tongs for holding a cooking container. The tongs have a fixed holding part with a moving gripping part that together are situated opposed to each other. The space between the moving part and the fixed is sufficient to allow the wall of the cooking bowl to be placed between the fixed part and the moving part. The tongs are so designed such that when the tongs are closed, the operating lever built into the tongs will cause the moving part to close the gap with the fixed part until these two parts grip the bowl wall enabling the bowl to be lifted. The tongs also contain spring that will separate the moving part from the fixed part when hand pressure is no longer applied releasing the cooking bowl. These tongs should not be confused with grill tongs in that they do not have any capability for nor can they be used for such routine grilling functions as grabbing a hotdog, flipping a burger or otherwise manipulating any other food items.

The above two inventions disclose removable handles that can only be used as removable handles. These removable handles are just another item needed by the cook near the stove or grill. With the plethora of grilling utensils used by grill cooks such as grill forks, grill brush, spatulas, knives, tongs, etc., the grill cook often has trouble juggling the use of all these different utensils. Adding a removable handle to the mix of utensils will make the cook's job more difficult. While suffering from the above described disadvantage, these handles are also assemblies of many dedicated components that make them more expensive to manufacture.

Accordingly, it would be desirable to have a cooking utensil that can also be used as a removable handle that is also simple to manufacture.

SUMMARY

Against this background, it is the object of this invention to provide a simple cooking utensil that can also be used as a handle for a suitably adapted cooking vessel. It is also the object to this invention to provide that these devices would not contain many parts making their manufacture less expensive.

As a solution, the invention proposes a cooking utensil, such as a set of cooking tongs, whereby the fixed distal ends of the tongs are manufactured to contain a notch on each side of the tong end. Also the invention proposes a cooking vessel that has a rectangular orifice into which the distal end of the cooking tong can be inserted. Envision that distal ends of the tongs each in the shape of a spatula where the tongs are inserted in the orifice positioned so that flat plain of the spatula shaped ends are inserted horizontally into the orifice. Once inserted, the user would be able to twist the tongs such that the wall of the cooking vessel would slide within each notch of the tong. Envision that the notch on the side of the tong that is rotated up would capture the wall of the vessel at the top of the orifice and the notch of the tong the side of the tong that is twisted down would capture the wall of the vessel at the bottom of the orifice. With tongs twisted and both notches capturing the walls as described, the tongs provide a secure grip on the cooking vessel permitting the tongs to function as vessel handle. In another embodiment, once the tongs were twisted a full 90 degrees, the user would release the pressure on the tongs permitting the two arms to separate and each arm would move horizontally to rest each on opposite sides of the orifice.

These and other features and advantages will be apparent from a reading of the following detailed description and a review of the associated drawings. It is to be understood that both the foregoing general description and the following detailed description are explanatory only and are not restrictive of aspects of the invention as claimed.

DETAILED DESCRIPTION

Figure 1:
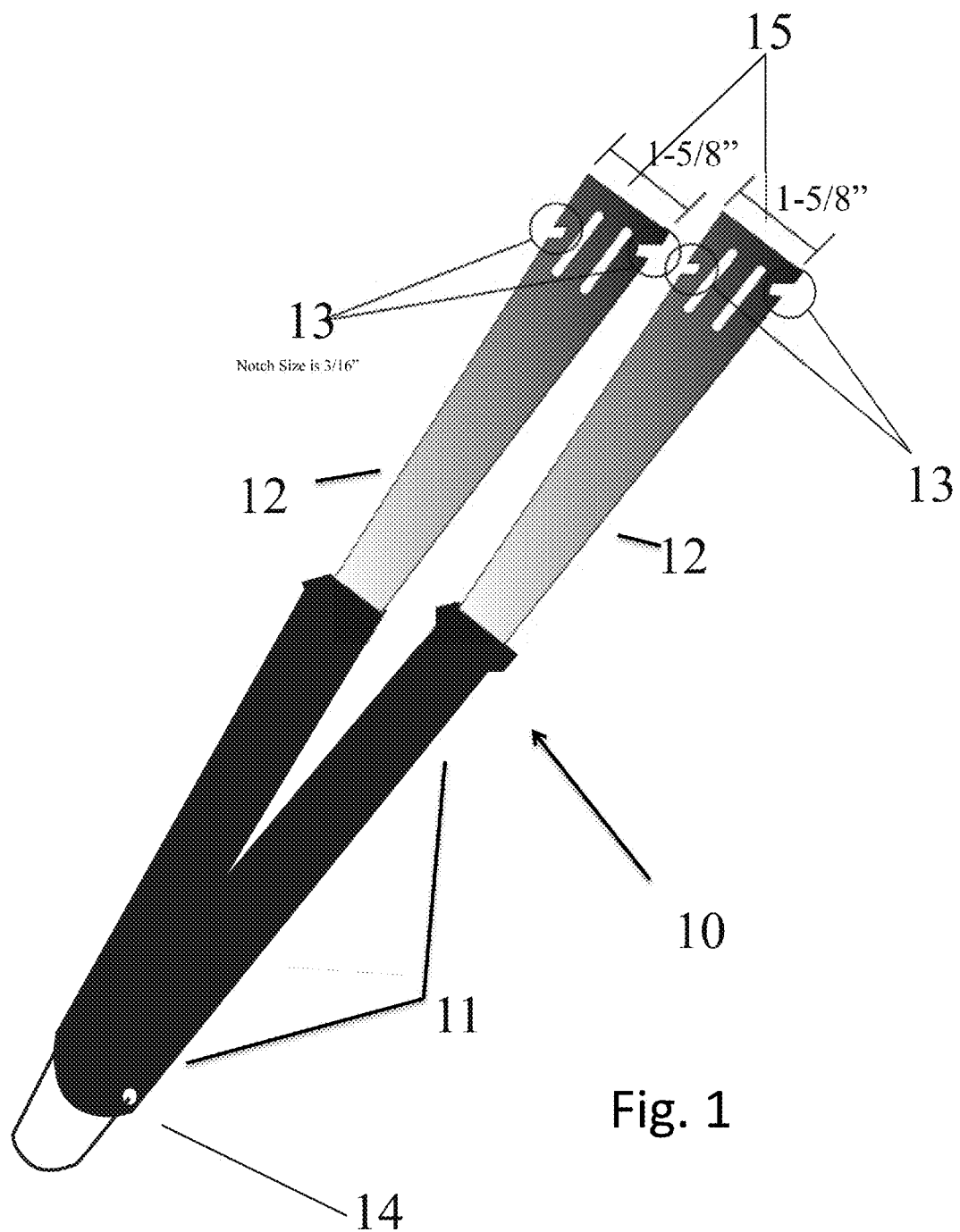
FIG. 1 in one illustrative embodiment of grill tongs in accordance with this invention.

With reference to FIG. 1, a typical set of grill tongs 10 as can be found in the art are shown with the modifications 13 to the tongs in accordance with my invention. The grill tongs have two opposable metal arms 12, hinged or bent at the proximal end 14. At some distance from the hinged end 14, the metal arms are coated with some heat insulating material 11, whether that be wood or plastic (both well known in the art), that provide an area that insulate the cook from any conducted by the tongs when proximate to the grill. The user of the tongs 10 can squeeze the metal arms 12 together to grab an item on the grill when the two opposing distal ends 15 of the metal arms are arranged to place an item of food between them. Usually within the hinge at the proximal end a spring is placed so when the user releases the hand pressure on the two arms the arms spring open. Some tongs do not have a hinge at the proximal end instead the two arms are created from a single piece of metal bent into a "U" shape and the tongs rely on the flexing response of the U shaped metal to act in similar fashion as a spring hinge. As the user squeezes the metal arms, any food positioned between the distal ends 15 is compressed and held so that it can be manipulated the user. In the preferred embodiment the distal ends are in the form of a spatula, with each end 1⅝ inches wide. However they can be in the form of fingers or forks or any other form or any combination thereof. For the purposes of our invention, the form of these distal ends 15 is only required to be of a shape to be able to accommodate notches 13 on the outside edges of these distal ends.

In the preferred embodiment, a one notch 13 is placed on each of the outside edges of these distal ends. These notches are offset 16 from each other by some defined distance that matches the angle of the sidewall of the grill basket shown in FIG. 2 (as better understood when said tongs 10 are used are used with the grill basket as described below in relation to FIG. 3). Also the size of the notches 13 need only be wider than the thickness of the sidewalls of the grill basket. In the preferred embodiment the notches are 3/16 inches wide. Also in the preferred embodiment these notches 13 are not just perpendicular to the edges in which they are placed but angled into the distal ends with the angles of the notches also set to be the same as or similar to the angle of the vessel walls to make sure that the tongs extend from the vessel at an angle to provide a usable handle angled away from the hot surface of the grill. In another embodiment, the notches 13 may be placed an equal distance from the distal end 15.

Figure 2A:
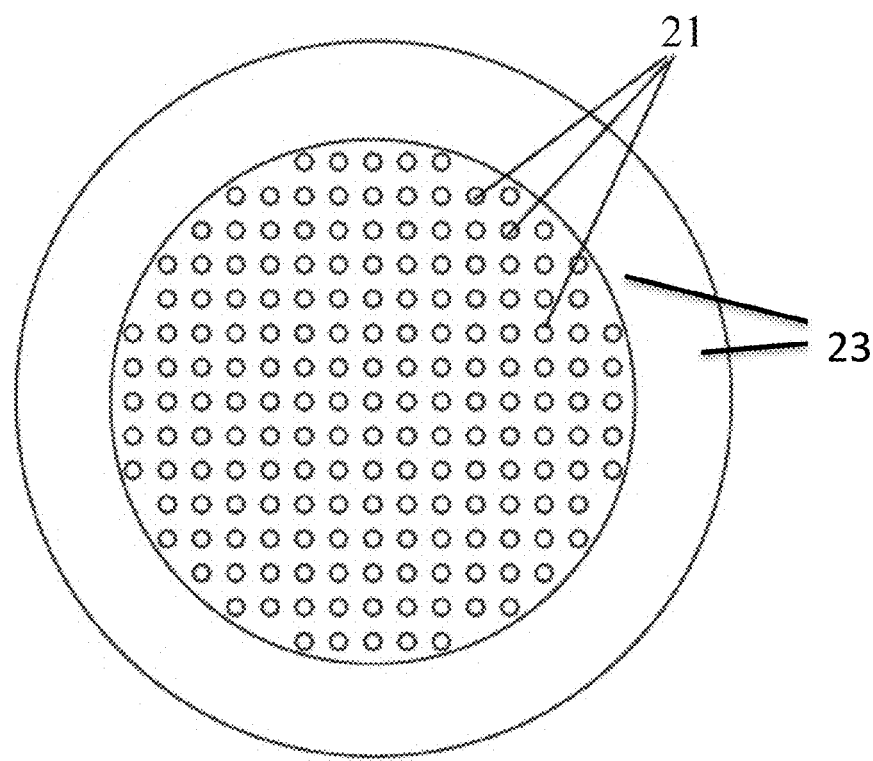
FIG. 2A is a top view of one illustrative embodiment of a cooking vessel in accordance with this invention.
Figure 2B:
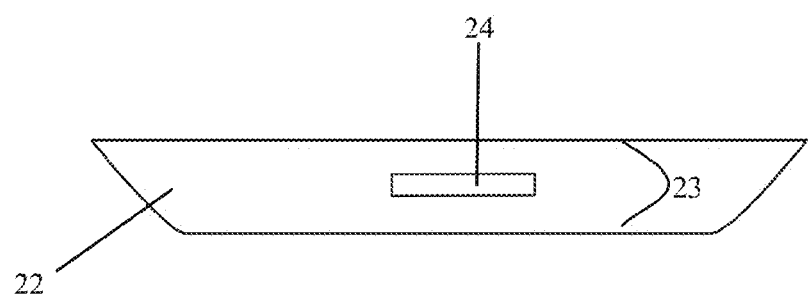
FIG. 2B is a side view of one illustrative embodiment of a cooking vessel in accordance with this invention.

FIG. 2A depicts a typical grill cooking basket used for such items as vegetables, diced chicken, pork of beef or any other food stuff for which there would be a problem with said food stuff falling through the grill if placed directly on the grill. These grill baskets are typically made of metal and formed in the shape of a bowl, basket or pan. Usually these baskets contain holes or slots 21 through which the juices generated by the cooking process can flow out while keeping the food contained. FIG. 2B provides a side view of a typical food grill basket 22 modified in accordance with one embodiment of my invention. In accordance with my invention, the side wall 23 of the grill basket is modified in at least one location to contain an opening or orifice 24 sufficient in size to allow the distal end of the cooking tongs 10 to slide into the opening 24. This orifice is approximately medially located in the sidewall and it is shaped so that it is wider than it is tall. In the preferred embodiment, the opening or orifice is in the shape of a rectangle with the dimensions 1¾ inches wide and 1¼ inches tall. However, alternate embodiments may include an opening or orifice of any other shape as long as it is of sufficient in width to allow the distal end 15 of the cooking tongs to slide into the opening 24 and provide sufficient height to permit the tongs to be twisted to enable the notches in the sides of the tongs accept the wall of the vessel. In the preferred embodiment the height shall be able to accommodate the tongs being twisted ninety degrees so that the wider plain of the distal ends of the tongs are now perpendicular to the medial axial of the vessel.

Figure 3A:
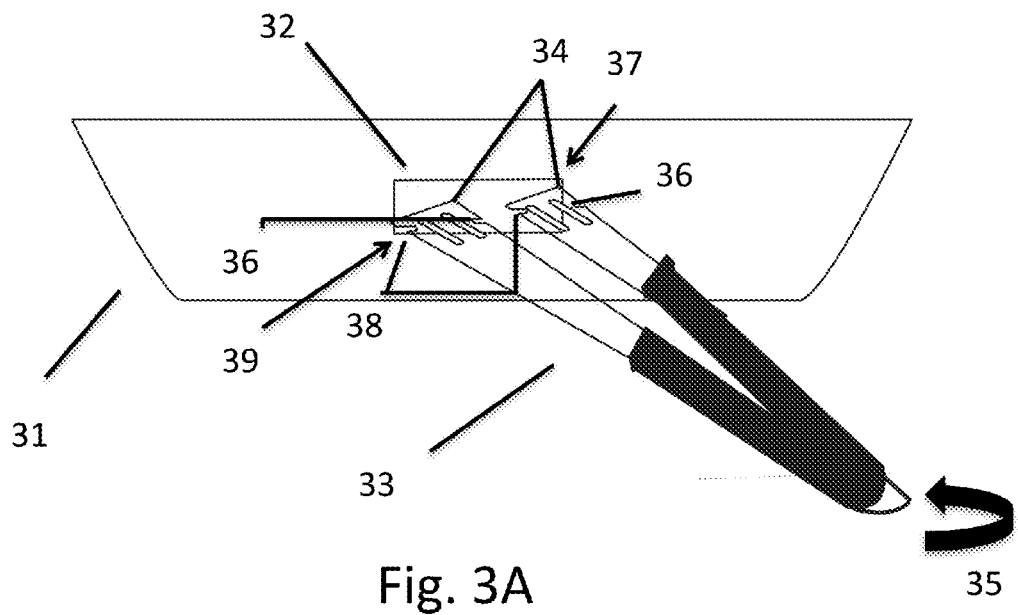
FIG. 3A illustrates the process of engaging a set of grill tongs with a cooking vessel provide a cooking vessel and handle in accordance with one embodiment of this invention.
Figure 3B:
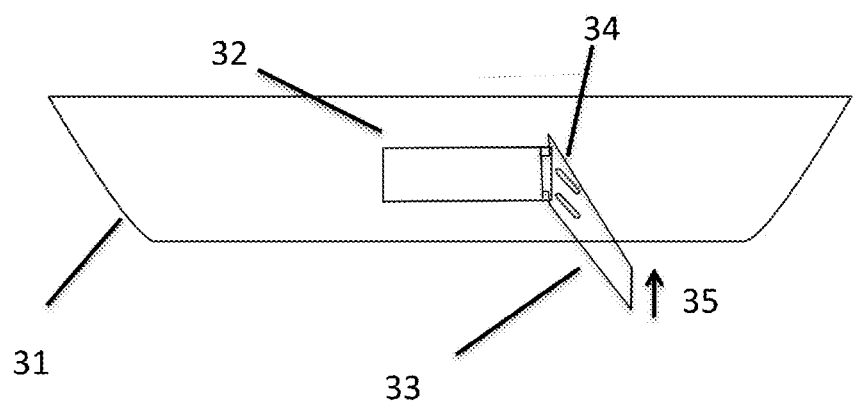
FIG. 3B illustrates the final position of the distal end of the grill tongs once engaged with a cooking vessel as illustrated in the process depicted in FIG. 3A.

FIGS. 3A and 3B illustrate the operation of my invention using cooking utensil in combination with a cooking vessel in accordance with my invention. A side view of a grilling basket 31 is depicted with a rectangular opening 32. As set of grill tongs 33 are also depicted wherein the user squeezes the tongs 33 so that the distal ends 34 are compressed together and inserted in the opening 32. The user twists the tongs 33 counter-clockwise 35 to move the notches 36 on the right outside of the tongs 33 to a position so that the sidewall 37 at the right upper end of the opening 32 fits neatly within the notch 36. At the same time the notches 38 on the left outside of the tongs 33 are moved to a position so that the sidewall 39 at the left lower end of the opening fits neatly within the notch 38. It is a simple move by the cook to close the tongs 33, insert them in the opening 32 in the sidewall of the cooking basket, twist 35 the tongs to position notches to capture the sidewalls of the basket so that the tongs are now securely connected to the basket to permit the user to use the tongs as a handle.

In the instance where the notches are all equal distant from the distal end of the tongs, the user only needs to modify the angle of the tongs in relation to the sidewall of the basket to make sure the tongs capture the walls when twisted. In the preferred embodiment of off-set notches, the measured distance of the off-set of the tongs is proportional to the angle of the sidewall and would be selected to provide a more natural angle between the tongs and basket to act as a handle for the basket. In the preferred embodiment, the tongs would be twisted a full 90 degrees, the notches on either side of the tongs distal ends would receive within them the walls of the vessel, and then when the hand pressure is released on the tong handles, the two arms would spring open so that each arm would expand to rest on each end of the opening. As an example the left arm would rest to the left side of the opening and the right arm would rest on the right side of the opening. With the notches located at the top of the distal ends having slid around the walls of the vessel at the top of the opening and with the notches located at the bottom of the distal ends having slid around the walls at the bottom of the opening and with the two arms now expanded to rest on their adjacent sides of the opening, the tongs now have four secure points of attachment to the vessel providing a very strong and stable handle. For additional clarity, FIG. 3B illustrates just the right arm 33 of a set of tongs wherein after the tongs are twisted ninety degrees the arm is now perpendicular (illustrated by arrow 38) to the medial axial of the grill basket 31 and the distal end 34 of the right arm 33 is engaged with grill basket wall on the right side of the opening 32 all completed in accordance with my inventive method.

Various other embodiments may be implemented in accordance with my invention. For example, any other standard grilling utensil such as a standard spatula could be modified with notches on either side of the distal end of the spatula on accordance with my invention with a cooking vessel having an opening large enough to accept the spatula. In another embodiment, instead of using notches in the cooking utensil, small protrusions or nubs may be used so that the protrusion or nub placed on the right outside of the utensil would be positioned on the inside of the side-wall of the vessel once inserted in the opening and twisted and the nub or protrusion on the left outside of the cooking utensil would be positioned on the outside of the opening in the cooking vessel. Thereby when the user lifts the utensil to pick up the cooking vessel the weight of the cooking vessel would secure the upper right side of the wall against the nob or protrusion and as well as the outside well will securely rest on the nub or protrusion on the left side of the utensil providing a stable handle. Further, in another embodiment, the notches can be offset in opposition direction to enable a clockwise twist that may better accommodate left handed cooks. Various other embodiments may be implemented using different elements, utensils, materials or a combination of all.

What is claimed:

1. A cooking utensil for use as a handle for a cooking vessel, wherein said utensil has a proximal end and a distal end and where said distal end has two side edges and wherein said cooking vessel has a sidewall with an opening to accept the insertion of said distal end, with said utensil comprising:
   a first means to engage a sidewall of a cooking vessel placed on one side edge of said distal end;
   a second means to engage a sidewall of a cooking vessel placed on the other side edge of said distal end; and
   wherein said first and second means are designed to be inserted in an orifice on a sidewall of a cooking vessel such that said first and second means can affix the utensil to the cooking vessel.

2. The cooking utensil of claim 1 wherein said first means and second means are notches.

3. The cooking utensil of claim 2 wherein said notches are positioned so that said first notch on one side edge of said distal end is placed at a different distance from the distal end than said second notch on the other side edge of said distal end wherein said different distance provides an offset proportional with an angel of said sidewall when said utensil is inserted into said opening of said vessel and twisted so that said first notch engages said sidewall at the top of said opening and said other notch engages of said sidewall at the bottom of said opening.

4. The cooking utensil of claim 2 wherein said utensil is a cooking tong having a first arm and a second arm.

5. The cooking utensil of claim 4 wherein further comprising:
   a third notch on left side end of said second arm;
   a fourth notch on the right side-end of said second arm; and
   wherein said first notch and said third notch are aligned so that they occupy the same position from the distal end of said first and said second arms and wherein said second and said fourth notches are aligned so that they occupy the same position from the distal end of said first and second arms.

6. The cooking utensil of claim 1 wherein said first means and said second means are protrusions.

7. The cooking utensil of claim 6 wherein said protrusions are positioned so that said first protrusion on left side edge of said distal end is placed at a different distance from the distal end than said second protrusion on the right side edge of said distal end wherein said different distance measured from front edge of said first protrusion to the back edge of said second protrusion and wherein said different distance to the provides an offset proportional with an angel of a side wall of a cooking vessel.

8. A cooking vessel with a removable handle wherein said cooking vessel has a base and a sidewall, and wherein said cooking vessel is in combination with a cooking utensil wherein said cooking utensil is a set of cooking tongs having a first arm and a second arm each having a proximal end and a distal end and where said distal end has two side edges, and wherein said cooking vessel and said utensil comprise:
   a cooking vessel with an orifice located in said sidewall and wherein said orifice is wider than it is tall and capable to accept the insertion of said cooking utensil; and wherein said tongs further comprise:
   a first means to engage a sidewall of a cooking vessel placed on left side edge of said distal end;
   a second means to engage a sidewall of a cooking vessel placed on the right side edge of said distal end;
   a third means to engage a sidewall of a cooking vessel placed on the left side edge of said distal end on said second arm;
   a fourth means to engage a sidewall of a cooking vessel placed on the right side edge of said distal end on said second arm;
   wherein said first means and said third means are aligned to be in the same position from said distal ends of said first and second arms; and
   wherein said second and said fourth means are aligned to be in the same position relative to said distal ends on said first and second arms on the opposite side-end from said first and third means; and
   wherein said cooking tongs engage said cooking vessel to become said vessel's handle when said cooking tongs are inserted in said orifice and turned so that said first and third means captures said vessel wall proximate to said first and third means and said second and fourth means capture said vessel wall proximate to said second fourth means.

9. The cooking vessel of claim 8 wherein said orifice is in the shape of a rectangle.

10. The cooking vessel of claim 9 wherein said cooking vessel is a grilling basket.

11. The cooking vessel of claim 10 wherein the orifice is 1 and three-quarters of an inch wide.

12. The cooking vessel of claim 11 wherein said orifice is 1 and one quarter of an inch tall.

13. The cooking tongs of claim 8 wherein said first, second, third and fourth means are notches.

14. The cooking tongs of claim 8 wherein said first, second, third and fourth means are protrusions.

15. A method for using a grilling utensil as a detachable handle for a grilling basket wherein said grilling basket has a side wall containing a rectangular opening and wherein said grilling utensil has a set of notches on opposite side edges of the distal end of said grilling utensil, said method comprises the steps of:
   inserting said distal end of said grilling utensil in said rectangular opening in said grilling basket;
   twisting said grilling utensil so that one of said notches on one side-edge of said grilling utensil slides around the basket wall proximate to said notch and the second of said notches on the other side wall of said grilling utensil slides around the wall proximate to said second notch; and
   lifting said grilling basket so that the weight of said basket secures the basket to said grilling utensil resting in said first and second notches.

16. The method of claim 15 further wherein said utensil is a grill tong having two arms and wherein said twisting step requires that the user twist said grilling utensil 90 degrees.

17. The method of claim 16 further comprising the step after the twisting step of releasing the pressure on the handle of said tongs to permit the arms of the tongs to expand in opposite directions such that one arm rests on one side of said opening and the to other arm rests on the other side of said opening.

* * * * *